US007770856B2

(12) United States Patent
Depay

(10) Patent No.: US 7,770,856 B2
(45) Date of Patent: Aug. 10, 2010

(54) THIN COMPUTER MONITOR SUPPORT APPARATUS

(75) Inventor: Dean Depay, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1038 days.

(21) Appl. No.: 10/917,704

(22) Filed: Aug. 13, 2004

(65) Prior Publication Data

US 2006/0032998 A1 Feb. 16, 2006

(51) Int. Cl.
*E04G 3/00* (2006.01)
(52) U.S. Cl. ............... 248/284.1; 248/917; 248/924; 248/278.1; 361/679.01; 361/679.02
(58) Field of Classification Search ............ 361/679, 361/680, 681; 248/284.1, 917–924, 281.11, 248/371, 183.3, 278.1, 276.1, 274.1
See application file for complete search history.

(56) References Cited

U.S. PATENT DOCUMENTS

| 4,438,458 | A | * | 3/1984 | Munscher | ............... 348/838 |
| 4,834,329 | A | * | 5/1989 | Delapp | ............... 248/183.3 |
| 6,018,847 | A | * | 2/2000 | Lu | ............... 16/337 |
| 6,056,248 | A | * | 5/2000 | Ma | ............... 248/124.1 |
| 6,168,250 | B1 | * | 1/2001 | Rogov | ............... 312/294 |
| 6,481,057 | B2 | * | 11/2002 | Lin | ............... 16/340 |
| 6,695,274 | B1 | * | 2/2004 | Chiu | ............... 248/371 |
| 6,822,857 | B2 | * | 11/2004 | Jung et al. | ............... 361/681 |
| 7,130,186 | B2 | * | 10/2006 | Yu | ............... 361/681 |
| 2003/0223188 | A1 | | 12/2003 | Ha et al. | |
| 2004/0021051 | A1 | | 2/2004 | Chiu | |
| 2006/0029218 | A1 | * | 2/2006 | Lu et al. | ............... 379/433.13 |

FOREIGN PATENT DOCUMENTS

EP 1 312 851 A2 5/2003
EP 1 382 897 A2 1/2004

* cited by examiner

*Primary Examiner*—Kimberly T Wood

(57) ABSTRACT

An apparatus is disclosed for supporting a computer monitor of the type which has a thickness substantially less than the height and width thereof, said apparatus comprising: a base structure for resting on a support surface, said structure contacting said surface over a width and depth sufficient to provide a stable base for the computer monitor, the front of said structure extending under at least a portion of the monitor; a support member attached to the monitor for supporting the same; an elongated linkage having a rear pivot attachment to said base structure and a front pivot attachment to said support member; said rear pivot attachment permitting said linkage to pivot from a generally horizontal position to a generally vertical position; said front pivot attachment permitting the support member and monitor to pivot to assume a tilt angle within a predetermined limited vertical range during normal use and to pivot rearwardly so that said support member and monitor are generally parallel to said linkage for shipping and/or storage.

12 Claims, 6 Drawing Sheets

THIN COMPUTER MONITOR SUPPORT APPARATUS

The present invention generally relates to support apparatus for computer monitors, and particularly for relatively thin computer monitor configurations.

BACKGROUND OF THE INVENTION

With the advent and proliferation of relatively thin computer monitors, such as the liquid crystal displays that are becoming more popular, there is more design freedom to develop support mechanisms for such relatively thin monitors that exhibit creative design features as well as improved functionality. This is due to the fact that such thin monitors do not weigh nearly as much as the old CRT monitors, nor do they have the significant depth that produces a large footprint. Of course, such LCD displays are not entirely new and support apparatus for such monitors have been developed and commercialized. Many of the early designs were static, in that they did not permit any significant movement of the LCD screen other than the adjustment of the screen tilt angle. More recent designs have permitted some degree of height adjustment including one that has been commercialized and is the subject of a patent application entitled "Computer Monitor Base With Height Adjustment", Ser. No. 10/692 982 and filed Oct. 24, 2003.

In that application which is assigned to the same assignee as the present invention, the monitor support incorporated a four bar parallelogram linkage to provide height adjustment, and it also permitted adjustment of the screen tilt angle. Moreover, the support permitted the parallelogram linkage to the moved down past horizontal and also permitted the monitor to be pivoted rearwardly through a limited amount of rotation to reduce the size of the entire unit to a size that facilitated storage and shipping costs.

While this support had many desirable attributes, significant improvements have since been made which are the subject of the present invention.

SUMMARY OF THE INVENTION

Embodiments of the present invention are directed to an apparatus for supporting a computer monitor of the type which has a thickness substantially less than the height and width thereof, said apparatus comprising: a base structure for resting on a support surface, said structure contacting said surface over a width and depth sufficient to provide a stable base for the computer monitor, the front of said structure extending under at least a portion of the monitor; a support member attached to the monitor for supporting the same; an elongated linkage having a rear pivot attachment to said base structure and a front pivot attachment to said support member; said rear pivot attachment permitting said linkage to pivot from a generally horizontal position to a generally vertical position; said front pivot attachment permitting the support member and monitor to pivot to assume a tilt angle within a predetermined limited vertical range during normal use and to pivot rearwardly so that said support member and monitor are generally parallel to said linkage for shipping and/or storage.

DETAILED DESCRIPTION

Figure 1:
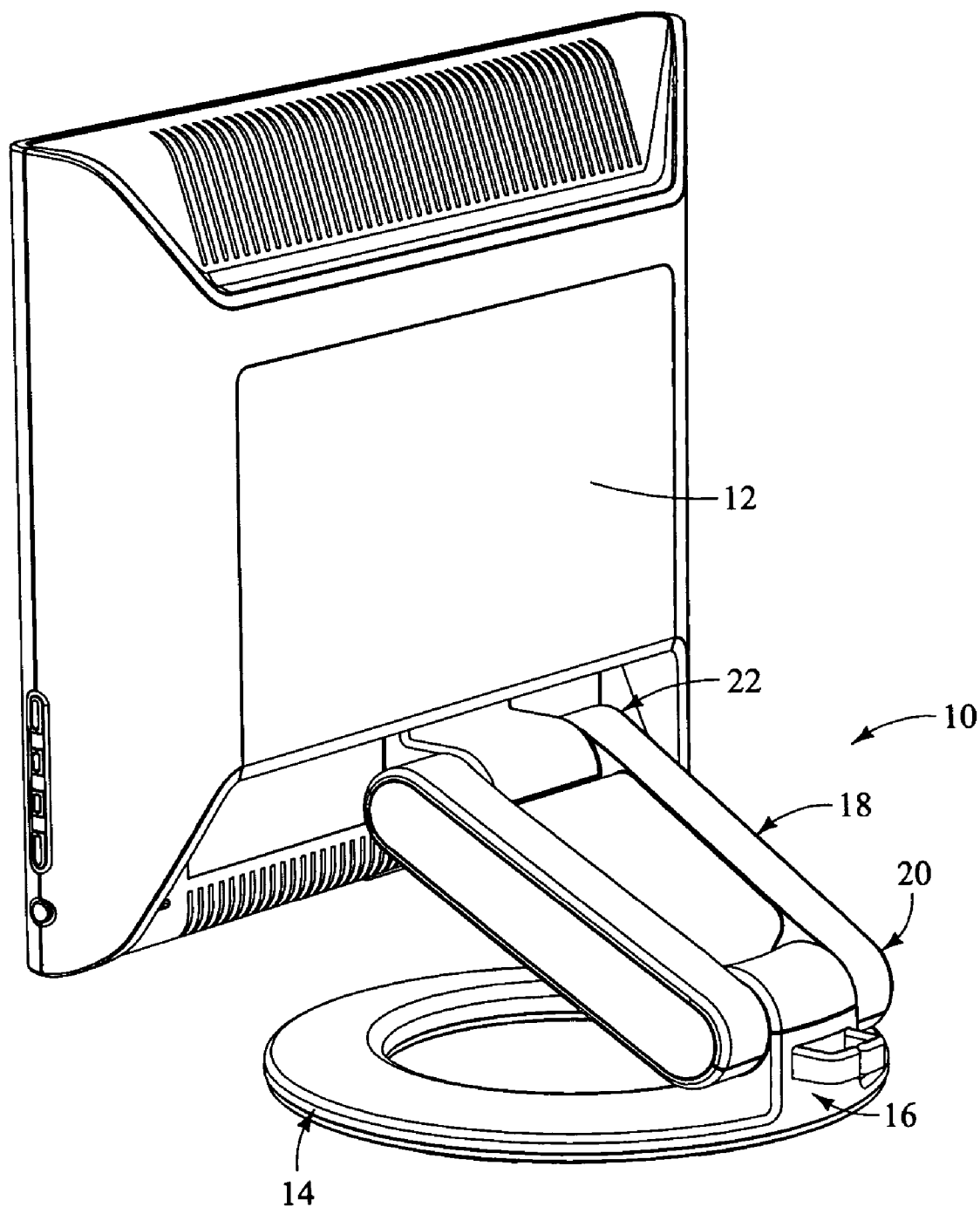
FIG. 1 is a rear perspective view of the preferred embodiment of the present invention shown together with an LCD monitor.

A preferred embodiment is shown in the drawings and will be described in detail. In the course of the description there will also be alternatives that will be described, and those alternatives are intended to be a part of the spirit and scope of the present invention. The preferred embodiment of the present invention is directed to an apparatus for supporting a computer monitor or other type of monitor that has a relatively thin configuration, such as liquid crystal displays that are enjoying increased popularity.

As will be shown in the drawings, these relatively thin monitors do not have a large footprint and the weight is therefore concentrated around a center of gravity that is aligned relatively close to the front face of the monitor than CRT monitors. One of the desirable attributes of the embodiment shown in the drawings is the fact that it can be easily manipulated to adjust the height of the monitor as well as its screen tilt angle and can also be folded into a relatively short configuration that is advantageous from a shipping standpoint in that a smaller container is required, and because of the smaller size, the shipping costs are also reduced compared to a larger container. The apparatus also has a fewer number of parts compared to prior designs that achieve some of the functional capabilities of the embodiments of the apparatus of the present invention.

Turning to the drawings, and particularly FIGS. 1-5, apparatus embodying the present invention is indicated generally at 10 and is shown with a monitor 12 attached to it. The monitor is not considered to be part of the present invention. The apparatus includes a generally ring-shaped base, indicated generally at 14, which has a rear attachment support, indicated generally at 16, to which a rear pivot attachment, indicated generally at 20, is connected. A four bar parallelogram linkage assembly, indicated generally at 18, is attached to the rear pivot attachment 20 and also to a front pivot attachment, indicated generally at 22, which is in turn connected to the monitor 12 by structure that will be hereinafter described.

Figure 2:
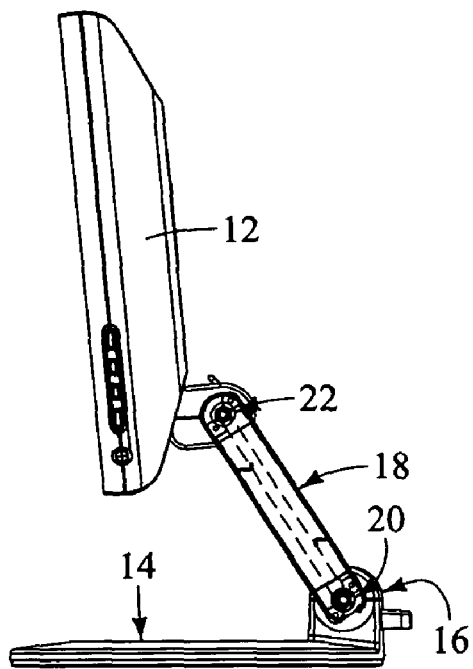
FIGS. 2, 3, 4 and 5 show the embodiment shown in FIG. 1 with portions removed, showing the apparatus with the monitor initially in a normal operating position and progressively folded into a generally flat position that would be desired for storage and/or shipping.

A particular advantage of the embodiment illustrated in FIG. 1 is the fact that it can be folded into a compact unit for storage and/or shipment. This is particularly illustrated in FIGS. 2-5 wherein the monitor 12 is shown to be in a normal viewing position in FIG. 2. In this view, the monitor is tilted forwardly, i.e., the top of the monitor is more forward than the bottom. In this position, the linkage assembly 18 is shown at a relatively high position in that angle of the linkage assembly relative to the horizontal plane of the base 14 is approximately 60-75°. Because of the nature of the four bar parallelogram linkage assembly 18 is such that the screen tilt angle of the monitor does not appreciably change as the angle of the linkage assembly changes, it should be appreciated that a user can easily adjust the elevation of the monitor by simply raising or lowering it to suit the user. In this preferred embodiment, the monitor preferably tilts rearwardly approximately 5° when the monitor is moved from its highest to its lowest position. This keeps the center of gravity of the monitor more rearwardly so that it will not tip over. Of course, the criticality of this happening is a function of the design of the monitor which can vary considerably. The position of the center of gravity at various heights should be considered together with the size and shape of the footprint of the base. Also as will be discussed in detail, the tilt angle can be changed within a limited range, preferably approximately 5° forward to approximately 25° in the rearward direction. The forward position is approximately as shown in FIG. 2.

Figure 3:
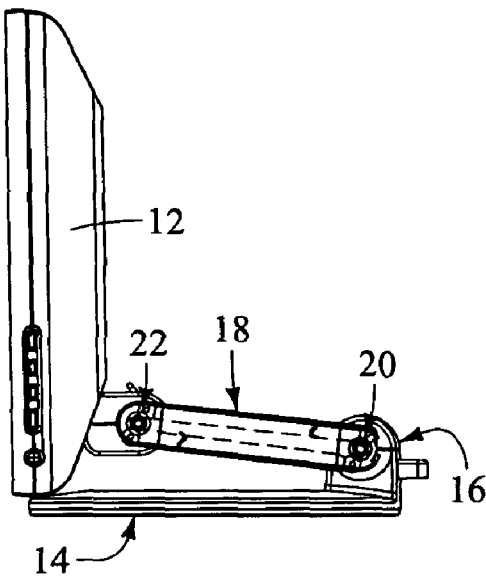
Figure 4:
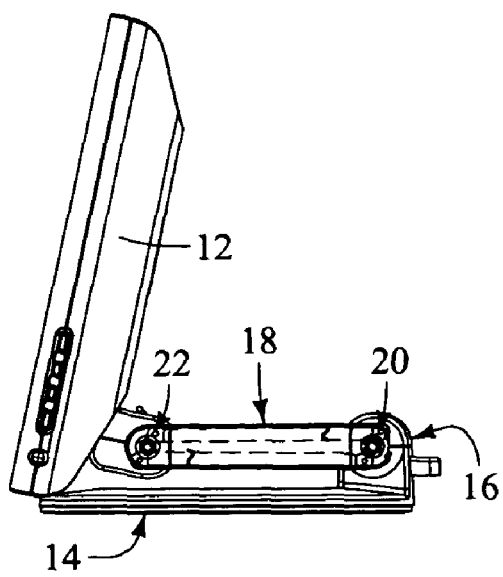
Figure 5:
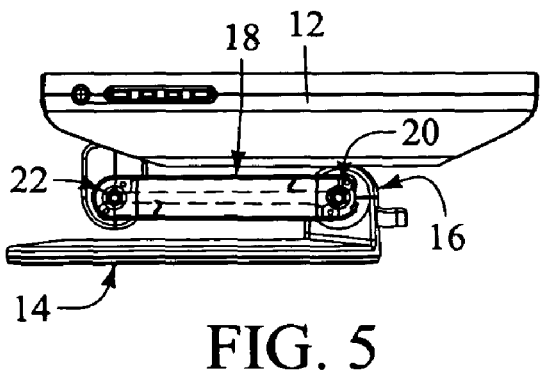

The monitor shown in FIG. 3 is lowered so that the bottom is approximately in contact with the base 14 and it is noted that the screen tilt angle of the monitor is approximately 5° rearward (to about true vertical) as just described. In this position, the linkage assembly approaches, but is not quite horizontal. In FIG. 4, the monitor has been manipulated to change the screen tilt angle to a backward position, and it is approximately at its backward limit of its normal range of motion. A detent mechanism limits the screen tilt angle in both directions. When it is in the position shown in FIG. 4, the linkage assembly 18 is substantially horizontal. The monitor can be tilted back rearwardly to the flat or horizontal position shown in FIG. 5 by pushing the monitor down with sufficient force to release or overcome the detent mechanism and permit it to be placed in this position. As is evident, the size of the monitor when it is completely folded down as shown in FIG. 5 is substantially less than in the other positions. This enables the unit to be placed in a relatively smaller container for storage or shipment.

Figure 6:
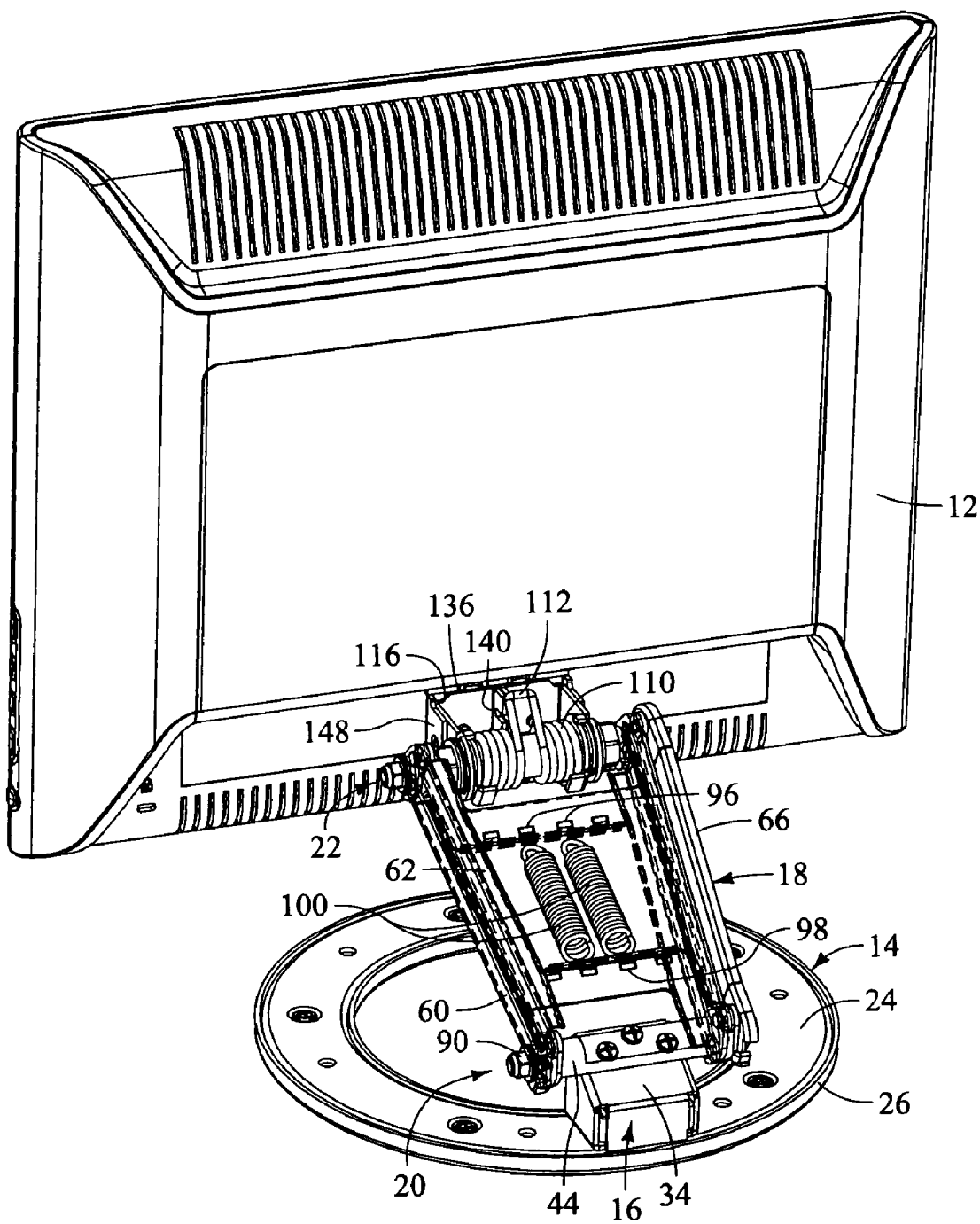
FIG. 6 is a rear perspective similar to that shown in FIG. 1, but with portions removed.
Figure 7:
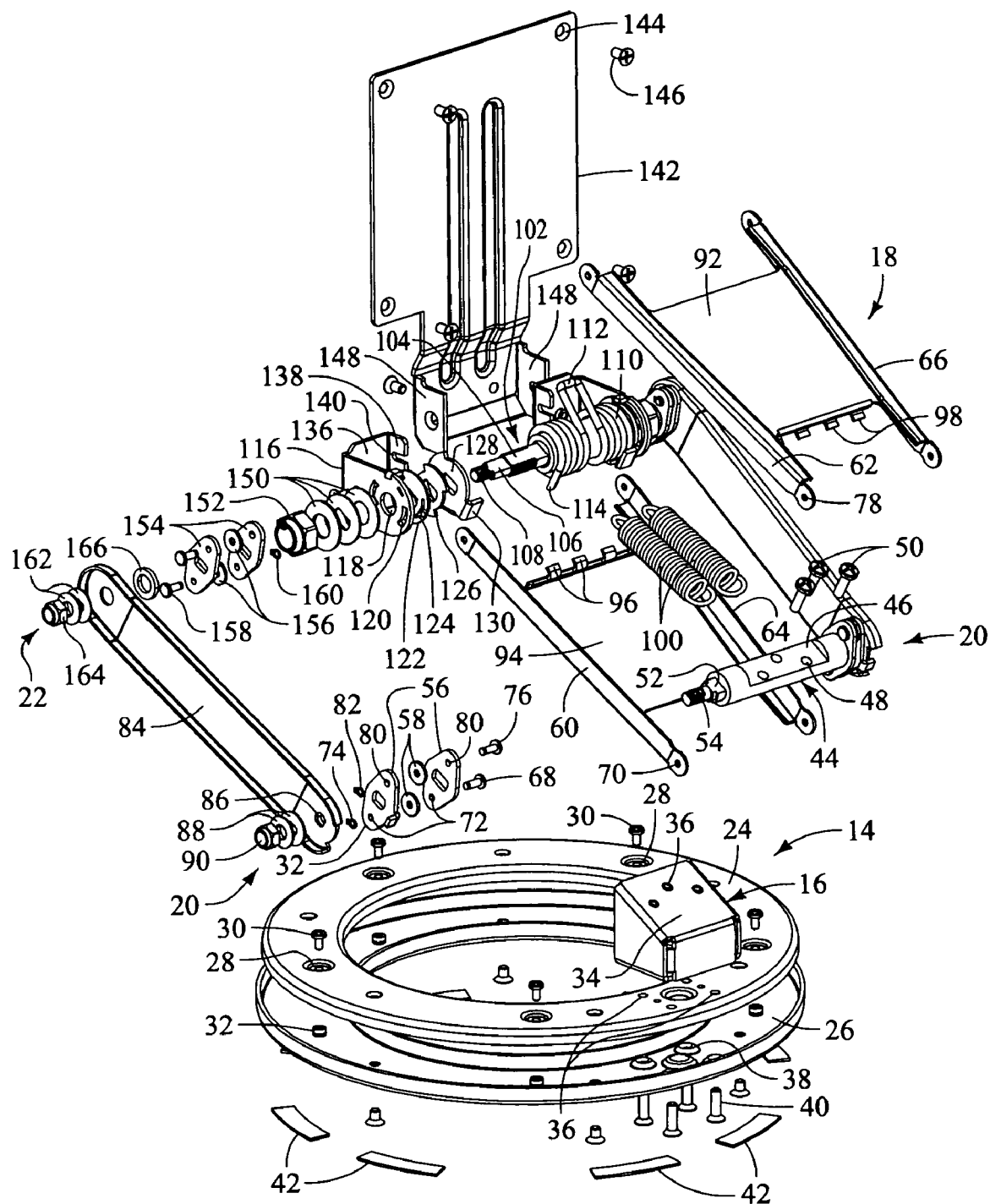
FIG. 7 is a partially exploded perspective of a portion of the embodiment shown in FIG. 6 and excluding the computer monitor.
Figure 8:
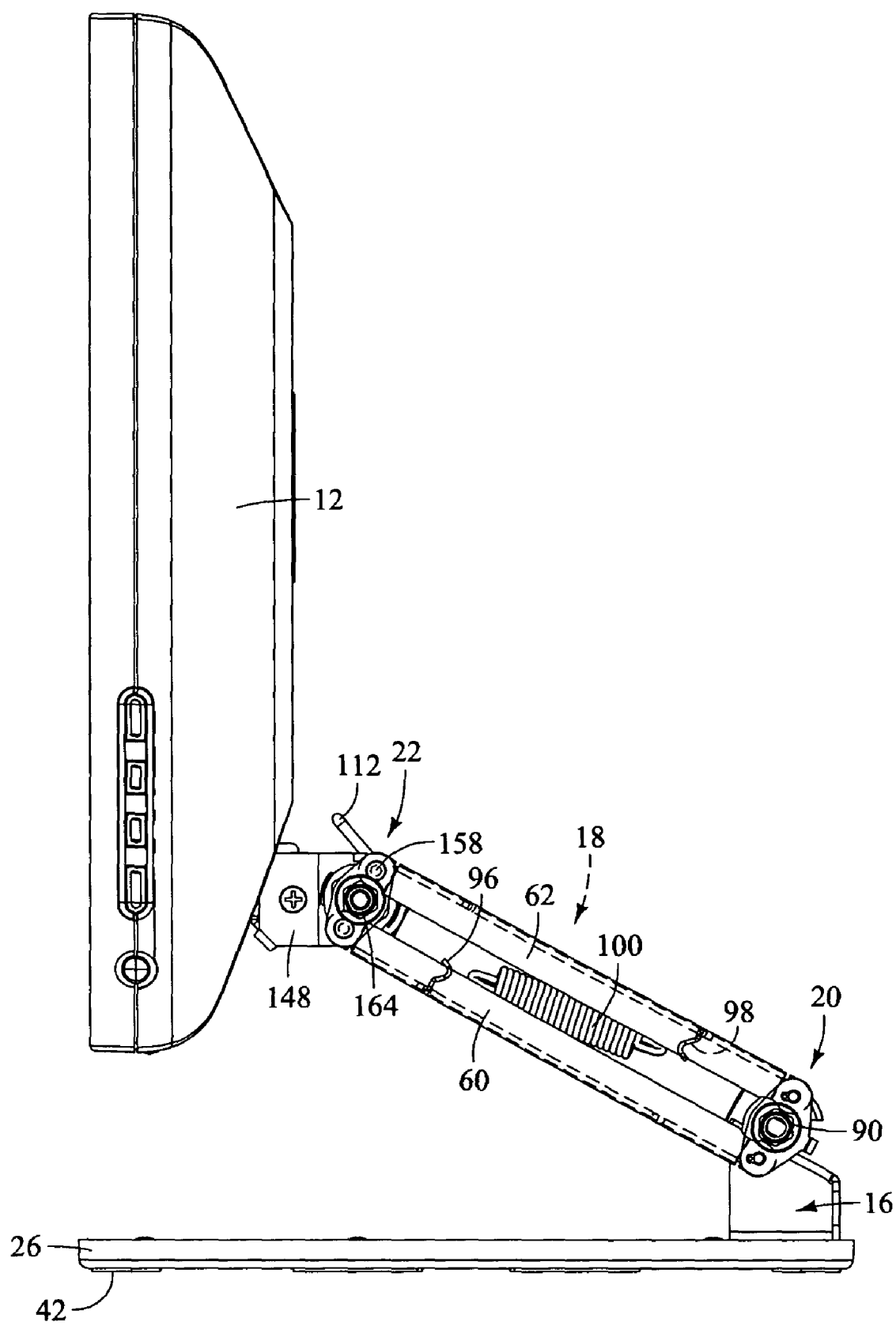
FIG. 8 is a side view of the embodiment shown in FIG. 6 with portions removed.

With regard to the specific detailed structure of the apparatus and referring to FIGS. 6-8, the base 14 is shown to have three main components, i.e., an upper ring 24, a lower ring 26 and the rear attachment support 16, all three components of which are secured together preferably by screws. The upper ring 24 has a number of holes 28 through which screws 30 may be inserted to engage a threaded protrusion 32 to attach the upper ring 24 to the lower ring 26. Additionally, the rear attachment support 16 is generally a truncated cube shape with an angled or slanted top 34 that has three threaded openings 36 (a pierce and tap configuration known to those of ordinary skill in the art) provided for attachment by a portion of the rear pivot attachment. The bottom of the rear attachment support has a pair of transverse side flanges (not shown) that are drilled and tapped and are aligned with holes 36 and holes 38 in the bottom ring 26 and through which screws are inserted to secure the attachment support 16 to the upper and lower rings 24 and 26. Rubber feet 42 are preferably attached to the underside of the lower ring 26 to protect surfaces on which the apparatus may be placed. While the base 14 is shown to be comprised of three major components, it should be understood that a single casting may be made which would provide at least as much if not more weight as the sheet metal that is preferably used for these base components that are illustrated and would reduce the number of parts that would be necessary for the base.

The linkage assembly 18 is attached to the rear pivot attachment 20 which is comprised of an axle 44 that has a central portion containing flats 46 on opposite sides thereof and which also contains three holes 48 through which screws 50 can pass and be threaded into tapped holes 36 in the top 34 of the support 16. These screws 50 hold the axle 44 firmly in place and significantly it does not rotate. The outer ends, only the left of which can be seen in any detail in FIG. 7 have a reduced diameter flat portion 52 and a smaller threaded portion 54.

A pair of elongated keyed washers fit onto the flat portion 52 and the keyed washers sandwich smaller washers 58 as well as the rearward end of a lower left bar 60 and the rearward end of an upper left bar 62. A lower right bar 64 and an upper right bar 66 are attached similarly to the keyed washers on the opposite end of the axle 44. More specifically, a pin 68 passes through an opening 70 as well as through an openings 72 in the keyed washers 56, and the pin 68 is secured by a C-clip 74 or the like. Similarly, the upper pin 76 passes through opening 78 in the upper left bar 62 as well as through openings 80 in the keyed washers 56 and pin 76 is secured by another C-clip 82. A side support member 84 has an opening 86 that is only slightly larger than the threaded portion 54 of the axle 44 and it fits on this reduced diameter portion and a pair of washers 88 form a friction washer stack that fits onto the threaded portion 54 before a lock nut 90 is threaded onto the threaded portion 54. One of the washers 88 is a standard flat washer while the other is preferably a conical spring washer and this is provided for the purpose of producing friction that will control the amount of force that is required to manipulate the linkage and side support to elevate or lower the monitor. The lock nut 90 can be rotated to tune the amount of friction that is desired.

With regard to the parallelogram linkage assembly 18, two upper bars 62, 66, as well as the two lower bars 60, 64 are preferably integrally formed with a bridging plate portion. More particularly, the upper bars 62 and 66 have a bridging plate portion 92 and lower bars 60 and 64 are formed with a bottom plate portion 94. The bottom plate portion 94 has a number of tabs 96 extending upwardly from its front end, with the preferred embodiment preferably having four of such tabs. Similarly, the upper plate portion 92 has preferably four similar extensions 98 that are extending downwardly from its rear end. The tabs are spaced apart from one another across the width of the plates portions and the tabs 96 are generally in line with tabs 98.

A pair of extension springs 100 are provided with one end of each being connected to one of the tabs 96 of the lower plate portion 94 and the opposite end connected to the tabs 98 of the upper plate portion 92. The purpose of the springs 100 is to provide an upward bias on the linkage 18 for the purpose of countering the weight of the monitor as well as the structure of the apparatus that is forwardly of the rear axle 44. The strength of the springs as well as the number of them can be determined so that the monitor will stay in the position that it is placed, the springs providing compensation for the weight of the apparatus and monitor. It should be understood that while two springs are shown, if a large size monitor is used with the support apparatus 10, additional springs may be necessary and the preferred embodiment has sufficient space between the bars to have four springs located therein. A side view of the configuration is shown in FIG. 8. It should also be understood that the force of the springs 100 also should be considered together with the tuning of the friction washers 88 so that the linkage 18 can be adjusted without requiring excessive force, and yet will maintain its position when the height of the monitor is set.

Turning now to the front pivot attachment 22, it includes a front axle, indicated generally at 102, that has a larger diameter threaded portion with flats 104 as well as a smaller diameter portion 106 also with flats and a still smaller threaded portion 108. The opposite end of the axle 102 is similarly configured. A torsion spring 110 which has a middle arm 112 and an end leg 114 fits on the axle.

The attachment 22 also has a pair of brackets 116 each of which have an opening 118 that is sized so that the bracket can fit on the portion 104. As is evident, it is not keyed and is therefore free to rotate around the axle. It also has a pair of arcuate slots 120 which have an arc of approximately 30° and are a part of a detent mechanism that permits limited movement of approximately 30° of adjustment of the tilt angle of the monitor. In this regard, a keyed washer 122 is adjacent to the side wall of the bracket 116 and it has a pair of raised bumps 124, only one of which is shown, but which fit in each of the arcuate slots 120. Thus, as the bracket 116 rotates about the axle, the keyed washer 124 is stationary and the amount of rotation is limited by the interaction of the bumps 124 in the slot 112.

A keyed backup washer 126 with outer arcuate perimeter openings also contacts the keyed washer 122 to stiffen it in the areas other than where the bumps 124 are located, those areas with bumps 124 desirably flexing during operation. Another keyed washer 128 has a transverse flange 130 that is in contact with the end leg 114 of the torsion spring 110 and prevents the end leg 114 of the torsion spring 110 to rotate in the counterclockwise direction as viewed from the left end of the axle shown in FIG. 7. The bracket 116 also has a rear wall 136 and a return extension 138 in which a slot 140 is located. The bracket 116 as well as the symmetrical bracket on the opposite end of the axle are both attached to a monitor attachment plate 142 that is also known in the art as a visa grabber.

The visa grabber structure has four openings 144 in which screws 146 attach to the monitor 12. There is a known manufacturing standard whereby the size and configuration of the visa grabber is standardized insofar as the portion of the visa grabber that is attached to the monitor 12. The bottom of the visa grabber 142 has a pair of side walls 148 configured so that when the brackets 116 are fit within the sidewalls 148, they can be secured to the visa grabber 142 on the sides as well as the back by screws, rivets or the like. When the bracket 116 is secured to the visa grabber 142 as is best shown in FIG. 6, the two brackets 116 are effectively attached to one another. While the middle arm 112 of the spring 110 is shown in its normal unstressed or zero position (which in the illustrated embodiment occurs when the monitor is tilted back approximately 25°), the middle arm 112 is normally located within the slot 140 of the two brackets 116. This means that the middle arm 112 is rotated counterclockwise relative to the position shown in FIGS. 6 and 7 and will therefore create a force that tends to act upwardly on the visa grabber. This aids the user in lifting the monitor during use.

When it is desired to pivot the monitor rearwardly toward the position shown in FIG. 5, the visa grabber 142 as well as the attached bracket 116 will rotate around the axle 102, thereby stressing the spring 110 in the clockwise direction as viewed from the left as shown in FIG. 7. Since the amount of rotation is approximately 95°, the spring 110 will become loaded. When the monitor is to be returned to its vertical position, the action of the spring aids the user in lifting the monitor upwardly. Thus, the spring 110 stores energy for lifting the elevation of the monitor during adjustment by a user and also assists in returning the monitor from a horizontal to a generally vertical position.

The front pivot attachment also has a friction washer stack comprised of washers 150 which include a conical spring washer for controlling the amount of friction against rotation that is desired so that the tilt angle of the monitor will be capable of being relatively easily adjusted, but which will maintain its position after adjustment. This is achieved by lock nut 152 which screws onto the larger threaded portion 104. When the nut 152 is threaded onto the portion 104, the smaller keyed portion 106 is exposed and a pair of keyed washers 154 are placed on the flat portion 106 along with washers 156 and the front end of bars 60 and 62. These are interconnected with pins 158 and C-clips 160 in the same manner as was described with regard to the rear pivot attachment 20. The left end of the side support 84 also fits on the portion 108 and a friction washer stack comprised of washers 162, one of which is a conical washer may be provided to control the amount of friction at the upper end relating to the angular position of the parallelogram linkage assembly 18. A lock nut 164 is tightened on portion 108 of the axle 102 to set the amount of friction at the desired level. A washer 166 fills the space between the adjacent keyed washer 154 and the inside surface of the side support 84 that is taken by the head of the pins 158. While the friction washer stack 162 is shown in the drawings, it may not be required. The washer stack 88 located on the rear pivot attachment 20 may provide sufficient friction for the linkage 18 operation.

Figure 9:
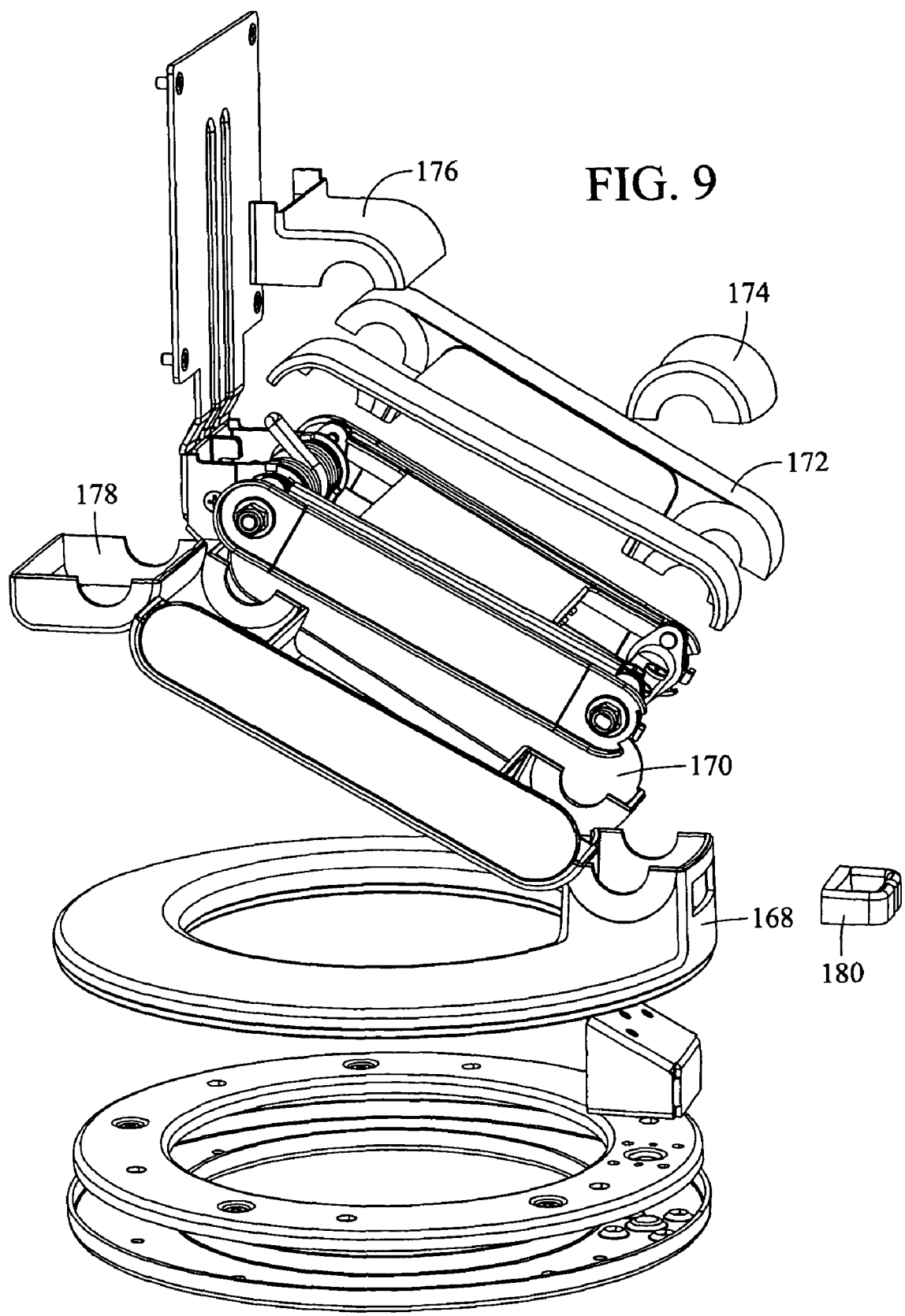
FIG. 9 is an exploded perspective of the embodiment shown in FIG. 1, particularly illustrating the covers that surround the apparatus.

It should be understood from FIG. 1 that the apparatus has outer covers that hide the mechanical components that have been described and also provide a more attractive appearance. This is achieved by using cover components that are designed to either be snap fit together or attached by screws. More particularly, and referring to FIG. 9, a base cover 168 fits over the upper ring 24 as well as the rear attachment support 16. A bottom cover component 170 is placed on the rear attachment support 16 before the parallelogram linkage assembly 18 and rear pivot attachment 20 are installed on the attachment support 16. When both of these steps are completed, a top linkage assembly cover 172 fits over the linkage assembly and snap fits together with the lower cover component 170. A base cap 174 then fits onto the rear attachment support 16. Similarly, upper and lower covers 176 and 178 snap over the lower portion of the visa grabber 142 and front pivot attachment 22 which completes the installation of the covers. A cable manager component 180 may be provided and attached to the cover 168. This is a split flexible claw-like component made of rubber or some other flexible material that enables the cables from the monitor 12 to be fit into it and be held in place. It is preferred that the covers be made of ABS or ABS/PC plastic or some other suitable plastic or plastic-like material.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. Apparatus for supporting a computer monitor of the type which has a thickness substantially less than the height and width thereof, said apparatus comprising:

a base structure for resting on a support surface, said structure contacting said surface over a width and depth sufficient to provide a stable base for the computer monitor, the front of said structure extending under at least a portion of the monitor;

a support member attached to the monitor for supporting the same;

an elongated linkage having a rear pivot attachment to said base structure and a front pivot attachment to said support member, wherein said elongated linkage comprises a four bar parallelogram linkage with two top bars being connected together by a top plate and two bottom bars being connected together by a bottom plate, each of said top and bottom bars adjacent one another being a set of bars, one end of each set of said bars being connected to said front pivot attachment and the other end of each set of said bars being connected to said rear pivot attachment;

said rear pivot attachment permitting said linkage to pivot from a generally horizontal position to a generally vertical position;

said front pivot attachment permitting the support member and monitor to pivot to assume a tilt angle within a predetermined limited vertical range during normal use and to pivot rearwardly so that said support member and monitor are generally parallel to said linkage for shipping and/or storage, wherein said linkage further comprises a side support located adjacent each set of bars, one end of each side support being pivotally connected to said front pivot attachment and the other end being pivotally connected to said rear pivot attachment, and a friction producing mechanism located at least on the pivotal connection of said side supports to said front pivot attachment to control the amount of force required to pivot said side supports relative to said front pivot attachment.

2. Apparatus as defined in claim 1 wherein said friction producing mechanism is a washer stack including flat and conical washers which increase rotational friction as a function of compression of said stack.

3. Apparatus as defined in claim 1 wherein said front pivot attachment comprises:
   a front axle having at least one non-rotating fitting attached to each end portion thereof, said fitting being connected to said one end of said set of bars;
   said support member being operatively connected to and rotatable around said front axle;
   a friction producing mechanism located on said front axle for controlling the force necessary to rotate said support member;
   a detent mechanism for normally limiting adjustment of the tilt angle of said support member through a predetermined arc, said detent mechanism being capable of releasing said support member responsive to a predetermined force so that it can be pivoted rearwardly to said generally parallel to said linkage position;
   a torsion spring mechanism for providing a force tending to assist a user in raising and lowering the elevation of said support member and for pivoting said support member from said generally parallel to said linkage position to said normal tilt angle position.

4. Apparatus as defined in claim 3 wherein said front pivot attachment further comprises at least one bracket that is connected to said axle and is rotatable relative to said axle through approximately 90 degrees, said support member being mounted to said support member.

5. Apparatus as defined in claim 4 wherein said detent mechanism comprises a washer having at least one raised tip for engaging an arcuate slot in said bracket, the length of said slot generally corresponding to said predetermined arc.

6. Apparatus for supporting a computer monitor of the type which has a thickness substantially less than the height and width thereof, said apparatus comprising:
   a base structure for resting the apparatus and monitor on a support surface, the front of said structure extending under at least a portion of the monitor;
   a visa grabber for attaching the monitor to said apparatus;
   a four bar parallelogram linkage having a rear pivot attachment to said base structure and a front pivot attachment to said visa grabber;
   said rear pivot attachment permitting said linkage to pivot from a generally horizontal position to a generally vertical position;
   said front pivot attachment permitting the visa grabber and monitor to pivot through a limited range of vertical screen tilt angles during normal use and to pivot beyond said limited range so that the screen tilt angle can be generally horizontal when said linkage is also generally horizontal;
   said front pivot attachment including a torsion spring configured to operatively engage said visa grabber and provide a first force for assisting in lifting the visa grabber and monitor from a generally horizontal position to said generally vertical position.

7. Apparatus as defined in claim 6 wherein said torsion spring is configured to provide a second force for assisting in raising the elevation of said spring grabber.

8. Apparatus as defined in claim 7 wherein said first and second forces are in opposite rotational directions.

9. Apparatus as defined in claim 6 wherein said four bar parallelogram linkage comprises two top bars being connected together by a top plate and two bottom bars being connected together by a bottom plate, each of said top and bottom bars adjacent one another being a set of bars, one end of each set of said bars being connected to said front pivot attachment and the other end of each set of said bars being connected to one of said fittings of said rear pivot attachment.

10. Apparatus as defined in claim 9 wherein a biasing means interacts with said top and bottom plates to counteract the weight of the monitor, linkage and front pivot attachment so that the monitor maintains the position in which it is placed.

11. Apparatus as defined in claim 1 wherein said top and bottom plates have a plurality of extension tabs along at least one edge across their width, said tabs being spaced from one another and aligned so that an extension spring can have opposite ends retained by an extension tab on each plate.

12. Apparatus as defined in claim 11 further comprising at least one extension spring having one end attached to the rear portion of said top plate and its other end attached to the front portion of said bottom plate.

* * * * *